US012431015B2

(12) United States Patent
Tseng

(10) Patent No.: US 12,431,015 B2
(45) Date of Patent: Sep. 30, 2025

(54) METHOD AND SYSTEM FOR INDICATING A PRESENCE OF A PEDESTRIAN USING TRAFFIC LIGHTS

(71) Applicant: Nanning FuLian FuGui Precision Industrial Co., Ltd., Nanning (CN)

(72) Inventor: Yung-Wei Tseng, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 72 days.

(21) Appl. No.: 18/594,154

(22) Filed: Mar. 4, 2024

(65) Prior Publication Data

US 2025/0279000 A1 Sep. 4, 2025

(51) Int. Cl.
*G08G 1/07* (2006.01)

(52) U.S. Cl.
CPC .................................... *G08G 1/07* (2013.01)

(58) Field of Classification Search
CPC .................................................. G08G 1/07
See application file for complete search history.

(56) References Cited

U.S. PATENT DOCUMENTS

2016/0131358 A1* 5/2016 Spiro ...................... H01F 27/24 455/561
2020/0410263 A1 12/2020 Gao et al.
2021/0287533 A1* 9/2021 Gaurav .................... G08G 1/07
2023/0269462 A1* 8/2023 Xu ....................... G06V 10/147 348/372

FOREIGN PATENT DOCUMENTS

CN 103198678 A 7/2013
CN 105023449 A 11/2015
TW M567462 U 9/2018
TW 201947089 A 12/2019
TW I804175 B 6/2023

* cited by examiner

*Primary Examiner* — Davetta W Goins
*Assistant Examiner* — Sharmin Akhter
(74) *Attorney, Agent, or Firm* — ScienBiziP, P.C.

(57) ABSTRACT

A method and a system for indicating a presence of a pedestrian using traffic lights at a traffic intersection, the method comprising: setting a human body sensing device to detect whether a pedestrian is present in a pedestrian waiting area. When detecting that there are pedestrians in the pedestrian waiting area, controlling the operation state of a pedestrian warning light among the traffic lights in accordance with the setting position of the human body sensing device and the state information of the driving signal lights of the traffic lights. The method and the system could reduce the likelihood of traffic accidents while protecting the priority right of pedestrians.

8 Claims, 4 Drawing Sheets

METHOD AND SYSTEM FOR INDICATING A PRESENCE OF A PEDESTRIAN USING TRAFFIC LIGHTS

FIELD

A method and system for indicating a presence of a pedestrian in a crosswalk using traffic lights.

BACKGROUND

Under the principle of pedestrian priority, pedestrians have the right of way at intersections and all other motorists must give way to pedestrians.

At present, there are no known traffic signals at intersections to indicate the presence of the pedestrians in a crosswalk. Drivers approaching an intersection or turning left or right may not realize that a pedestrian is about to cross the road in their blind spot if their view is obstructed by other vehicles or the A-pillars to the left and right of the windscreen, or if the driver's view may be blurred by factors such as weather or night-time conditions. Under the above mentioned scenarios, when the pedestrians are seen crossing at the intersection by the driver, the drivers often have to brake suddenly to stop in time. Such sudden brakes can also lead to collisions.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
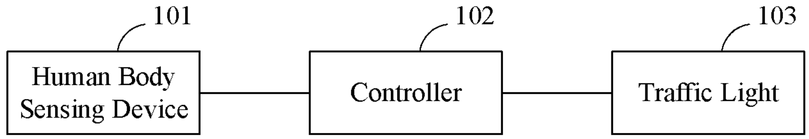
FIG. 1 is a block diagram illustrating an embodiment of a system in accordance with the present disclosure.

FIG. 1 is a block diagram of a system in accordance with an embodiment. The system comprises a human body sensing device 101, a controller 102 and a traffic light 103 provided at an intersection.

The human body sensing device 101 is used to detect movement information of pedestrians in pedestrian waiting areas of the intersection. In fact, the human body sensing device 101 may be a passive infrared sensor or a millimeter wave radar. The human body sensing device 101 may be used to implement a real-time monitoring function of pedestrian crossing behavior in one of the pedestrian waiting areas of the intersection.

It should be noted that a plurality of human body sensing devices 101 and the traffic light 103 may be provided at the intersection depending on the direction of driving, the human body sensing device 101 being provided one by one in correspondence with the traffic light 103. In one embodiment, the human body sensing device 101 may be provided on a pole where the traffic light 103 is located. In another embodiment, the human body sensing device 101 may also be provided one by one on a mounting pole corresponding to the pole on which the traffic light 103 is mounted. The exact location may be determined according to the practical situation and is not limited herein.

The controller 120 is used to control the operating state of the traffic light 103 based on the detected pedestrian movement information. In particular, the human body sensing device 101 detects the movement of a pedestrian and generates signals of different potentials which are converted into digital signals by an A/D converter and transmitted as pedestrian movement information to the controller 102 which determines the current position of the pedestrian and the direction of movement based on the received pedestrian movement information.

Figure 2:
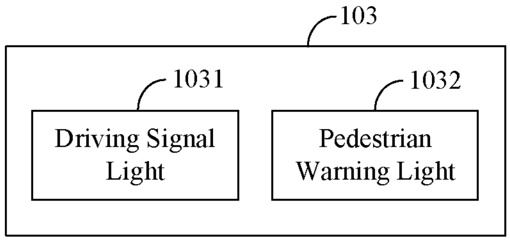
FIG. 2 is a schematic diagram of an embodiment of a traffic light in accordance with the present disclosure.

FIG. 2 is a schematic diagram of the traffic light 103 with an embodiment.

The traffic light 103 comprises a driving signal light 1031 and a pedestrian warning light 1032, wherein the controller 102 controls the driving signal light 1031 to illuminate a green light when vehicular traffic is permitted, and the controller 102 controls the driving signal light 1031 to illuminate a red light when vehicular traffic is prohibited. The controller 102 also determines whether to illuminate the pedestrian warning light 1032 based on the pedestrian movement information received from the human body sensing device 101 and the current phase of the driving signal light 1031, wherein when the pedestrian warning light 1032 is illuminated, it indicates that pedestrians are crossing or are about to cross the intersection.

Figure 3:
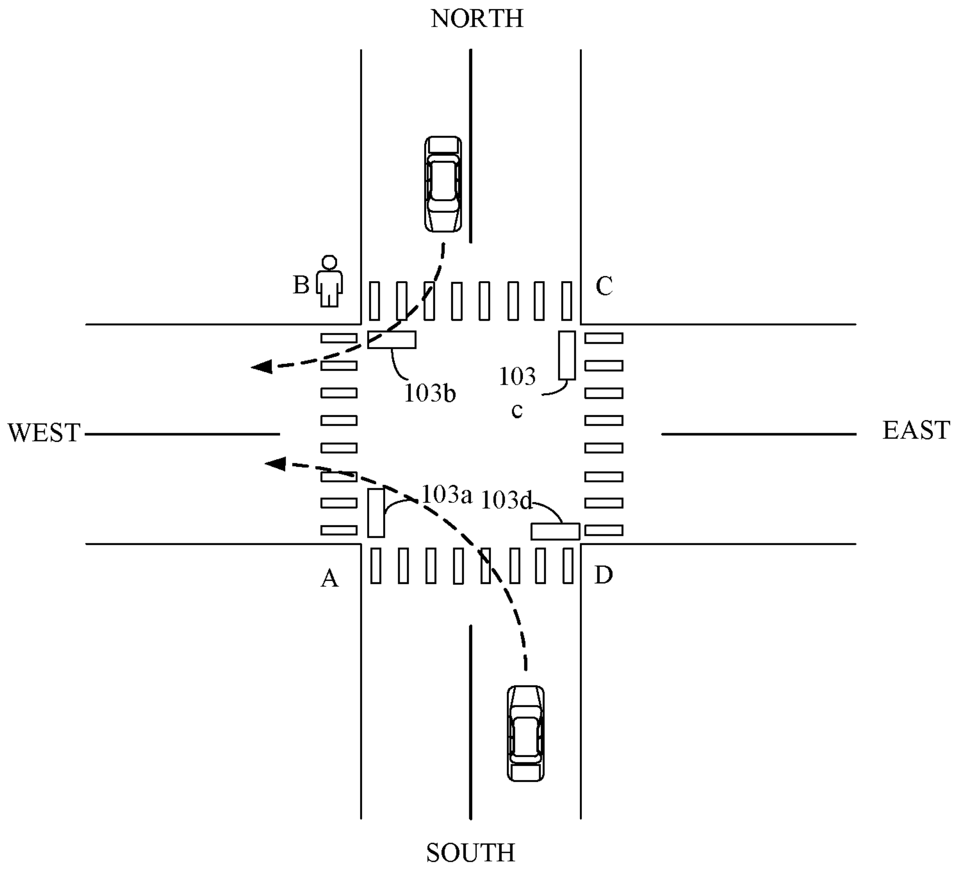
FIG. 3 is an illustration of an example of an arrangement of traffic lights at an intersection in accordance with an embodiment.

Take the intersection shown in FIG. 3 as an example. When the human body sensing device installed in area B detects a pedestrian waiting to cross the intersection to area A, the pedestrian warning light of the traffic light 103*b* will be illuminated if the phases of traffic light 103*b* and 103*d* in the same direction (north-south) are green and the phases of traffic light 103*a* and 103*c* in the other direction (east-west) are red. The illumination of the pedestrian warning light of the traffic light 103*b* could warn drivers of the vehicles in the north direction waiting to turn right to the west direction and could warn drivers of the vehicles in the south direction waiting to turn left to the west direction. In another embodiment, it is also possible to control the simultaneous illumination of the pedestrian warning light of the traffic light 103*a*.

Similarly, when the human body sensing device provided in area A detects a pedestrian waiting to cross the intersection to area B, if at that time the time phases of the traffic light 103*b* and 103*d* in the same direction (north-south) are green and the time phases of the traffic light 103*a* and 103*c* in the other direction (east-west) are red, the pedestrian warning light of the traffic light 103*a* is controlled to illuminate.

For example, as also shown in FIG. 3, since the human body sensing devices provided in areas C and D do not detect pedestrians, the traffic light 103*c* and 103*d* provided in areas C and D do not need to be illuminated with pedestrian warning lights, i.e. the pedestrian warning lights are controlled to be unilluminated.

Similarly, if the human body sensing device in area C or zone D detects a pedestrian waiting to cross the intersection to the opposite direction of the north-south direction, the time phases of the traffic light 103*b* and 103*d* in the same direction (north-south direction) are green and the time phases of the traffic light 103*a* and 103*c* in the opposite direction (east-west direction) are red, pedestrian warning lights of the traffic light 103*c* and 103*d* are controlled to be illuminated. The pedestrian warning lights of the traffic light 103*c* and 103*d* in areas C and D are controlled to be illuminated for warning drivers of vehicles located in the south direction waiting to make a right turn to the east direction, and at the same time for warning drivers of the vehicles located in the north direction waiting to make a left turn to the east direction.

Figure 4:
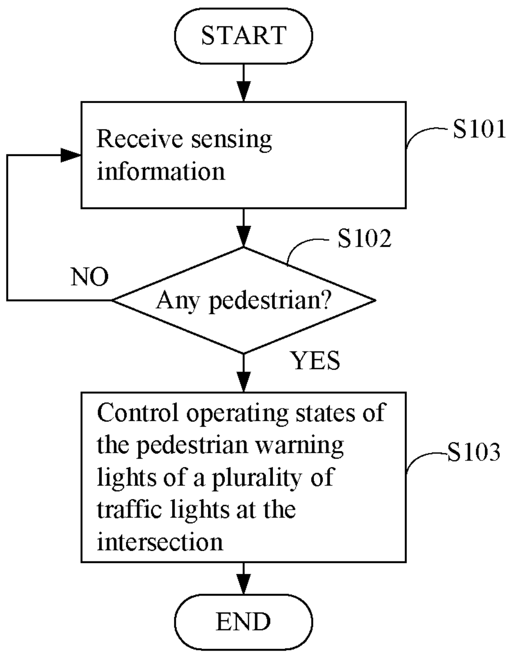
FIG. 4 is a flow chart of an embodiment of a method to indicate the presence of a pedestrian in a crosswalk using traffic lights in accordance with the present disclosure.

FIG. 4 is a flow chart of a method for warning a presence of a pedestrian using traffics with an embodiment. The method may be executed in the system of FIG. 1. Specifically, it may be executed by the controller 102 of FIG. 1.

In this embodiment, the method comprises the steps of:

Step S101, receives sensing information from the human body sensing device.

Specifically, the human body sensing device comprises a passive infrared sensor, millimeter wave radar, or any other sensing device that can be used to detect moving objects.

In this embodiment, the human body sensing device is used to sense whether there is any pedestrian nearby and send the sensing information to the controller.

Step S102, based on the received sensing information, the controller determines whether there is any pedestrian in a pedestrian waiting area.

The controller determines whether there is any pedestrian in the pedestrian waiting area according to the received sensing information. When it is determined that there is a pedestrian in the pedestrian waiting area, step S103 is executed; when it is determined that there is no pedestrian in the pedestrian waiting area, step S101 is continuously executed.

Step S103, controls operating states of the pedestrian warning lights of a plurality of traffic lights in an intersection according to a setting position of the human body sensing device and state information of driving signal lights of a plurality of traffic lights at the intersection. Wherein, the operating states of the pedestrian warning lights comprise an illuminated state and an unilluminated state.

First, based on the setting position of the human body sensing device, a first traffic light corresponding to the human body sensing device among the plurality of traffic lights could be determined.

Next, based on the state information of the driving signal lights of the plurality of traffic lights, a first direction associated with a current direction of traffic flow at the intersection could be determined.

Finally, the operating state of the pedestrian warning light of the first traffic light is controlled to be the illuminated state. At the same time, the operating state of the pedestrian warning light of a second traffic light of the plurality of traffic lights, which is located along the first direction and on an opposite side of the intersection to the first traffic light, is controlled to be the illuminated state. The operating states of the pedestrian warning lights of the remaining traffic lights are controlled to be the unilluminated states.

Again using FIG. 3 as an example, when the human body sensing device provided in the B area senses that there is a pedestrian in the pedestrian waiting area, the state information of the driving signal lights of the plurality of traffic lights 103*a*, 103*b*, 103*c*, and 103*d* are obtained. If the driving signal lights of the traffic lights 103*b* and 103*d* are in a green light state, it is determined that a first direction associated with the current direction of traffic flow at the intersection is a north-south direction. Then, at this time, the operating state of the pedestrian warning light of the traffic light corresponding to the B area is controlled to be the illuminated state, and at the same time, the operating state of the pedestrian warning light of the traffic light 103*a*, which is provided on an opposite side of the intersection to the traffic light 103*b* along the north-south direction, is also controlled to be the illuminated state. The operating states of the pedestrian warning lights of the remaining traffic lights 103*c* and 103*d* are controlled to be the unilluminated state.

In summary, the method and the system for indicating the presence of the pedestrian using traffic lights applies a human body sensing device to the detection of pedestrians at the traffic intersection. By means of the pedestrian warning lights, the intuitive reaction time of the driver is reduced, thus reducing pedestrian traffic accidents. It also reduce the number of rear-end collisions caused by emergency braking due to giving priority to the pedestrians.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A method for indicating a presence of a pedestrian by using a plurality of traffic lights at an intersection and controlled by a controller, the method comprising:

receiving sensing information from a human body sensing device;

determining whether a pedestrian is in a pedestrian waiting area based on the received sensing information; and controlling an operating state of a pedestrian warning light of one of the plurality of traffic lights according to a setting position of the human body sensing device and state information of driving signal lights of the plurality of traffic lights when a pedestrian is determined to be in the pedestrian waiting area, wherein the operating state comprises an illuminated state and an unilluminated state, and wherein the controlling an operating state of a pedestrian warning light of one of the plurality of traffic lights according to a setting position of the human body sensing device and state information of driving signal lights of the plurality of traffic lights when a pedestrian is determined to be in the pedestrian waiting area further comprises:

determining a first traffic light of the plurality of traffic lights corresponding to the human body sensing device based on the setting position of the human body sensing device;

determining a first direction associated with a current direction of a traffic flow at the intersection based on the state information of the driving signal lights of the plurality of traffic lights;

controlling the operating state of a pedestrian warning light of the first traffic light to be the illuminated state; and controlling the operating state of a pedestrian warning light of a second traffic light on a side opposite the first traffic light along the first direction to be the illuminated state.

2. The method of claim 1 further comprising providing the plurality of traffic lights corresponding to different directions of driving at the intersection.

3. The method of claim 1, wherein the human body sensing device comprises a passive infrared sensor and a millimeter wave radar.

4. The method of claim 1, wherein the controlling an operating state of a pedestrian warning light of one of the plurality of traffic lights according to a setting position of the human body sensing device and state information of driving signal lights of the plurality of traffic lights when a pedestrian is determined to be in the pedestrian waiting area further comprises:

controlling the operating state of a pedestrian warning light of each remaining traffic light of the plurality of traffic lights other than the first traffic light and the second traffic light to be the unilluminated state.

5. A system for indicating a presence of a pedestrian by using a plurality of traffic lights, the system comprising:

a controller;

a human body sensing device adapt for sensing if a pedestrian is in a pedestrian waiting area; and a plurality of traffic lights, each corresponding to a traffic direction of an intersection, wherein the controller is configured to:

receive sensing information from the human body sensing device;

determine whether a pedestrian is in the pedestrian waiting area based on the received sensing information;

control an operating state of a pedestrian warning light of one of the plurality of traffic lights at the intersection according to a setting position of the human body sensing device and state information of driving signal lights of the plurality of traffic lights when a pedestrian is determined to be in the pedestrian waiting area;

determine, based on the setting position of the human body sensing device, a first traffic light of the plurality of traffic lights corresponding to the human body sensing device;

determine, based on the state information of the driving signal lights of the plurality of traffic lights, a first direction associated with a current direction of a traffic flow at the intersection;

control the operating state of a pedestrian warning light of the first traffic light to be an illuminated state; and control the operating state of a pedestrian warning light of a second traffic light on a side opposite the first traffic light along the first direction to be the illuminated state.

6. The system of claim 5, wherein the controller controls the operating state of the pedestrian warning light to be either an illuminated state or an unilluminated state.

7. The system of claim 5, wherein the human body sensing device comprises a passive infrared sensor and a millimeter wave radar.

8. The system of claim 5, wherein the controller is further configured to: control the operating state of a pedestrian warning light of each remaining traffic light of the plurality of traffic lights, other than the first traffic light and the second traffic light to be the unilluminated state.

* * * * *